United States Patent [19]

Maruyama et al.

[11] Patent Number: 4,862,055
[45] Date of Patent: Aug. 29, 1989

[54] AUTOMOTIVE CHARGING APPARATUS

[75] Inventors: Toshinori Maruyama, Kariya; Hirohide Sato, Toyokawa; Toshiaki Matsuhashi, Kariya, all of Japan

[73] Assignee: Nippondenso Co., Ltd., Kariya, Japan

[21] Appl. No.: 198,056

[22] Filed: May 24, 1988

[30] Foreign Application Priority Data

May 25, 1987 [JP] Japan .................. 62-127437

[51] Int. Cl.⁴ .................. H02J 1/00
[52] U.S. Cl. .................. 322/8; 219/203
[58] Field of Search .................. 322/7, 8; 219/202, 203

[56] References Cited

U.S. PATENT DOCUMENTS 4,263,543 4/1981 Watrous et al. .................. 322/8
4,267,433 5/1981 Sahm, III .................. 322/8 X

FOREIGN PATENT DOCUMENTS 62-268327 11/1987 Japan .

OTHER PUBLICATIONS

Section 43-20, pp. 2-4, Heated Windshield System from '86 Ford Taurus Shop Manual.
Glass, Nov. 1986, vol. 63–"Heatable Automobile Windshields with Reduced Energy Transmission Characteristics," pp. 417-419.
Automotive Engineering, Oct. 1985, p. 38.

Primary Examiner—R. J. Hickey
Attorney, Agent, or Firm—Cushman, Darby & Cushman

[57] ABSTRACT

An automotive charging apparatus employs a high voltage load, such as a de-icing means for de-icing a windshield of the automobile, in the line which connects a battery with an alternator. The automotive charging apparatus also employs a switch in parallel with the high voltage load so that an output voltage is supplied both to the high voltage load and to the battery when the switch member is opened and the output voltage is supplied only to the battery when the switch member is closed. The output voltage of the alternator changes to the higher level when the switch member is opened in order to maintain the battery voltage within the range of the predetermined value.

5 Claims, 5 Drawing Sheets

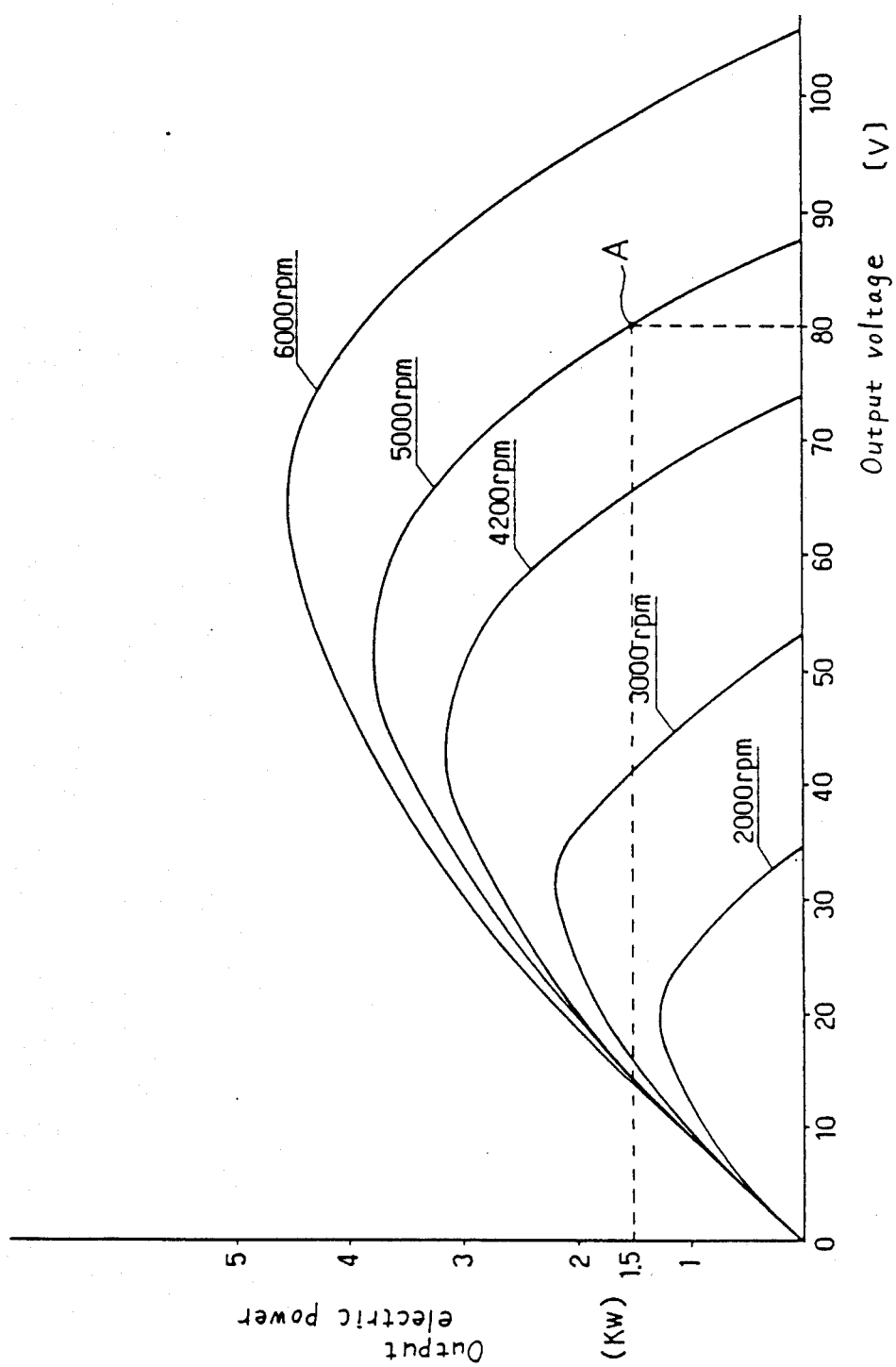

FIG.8
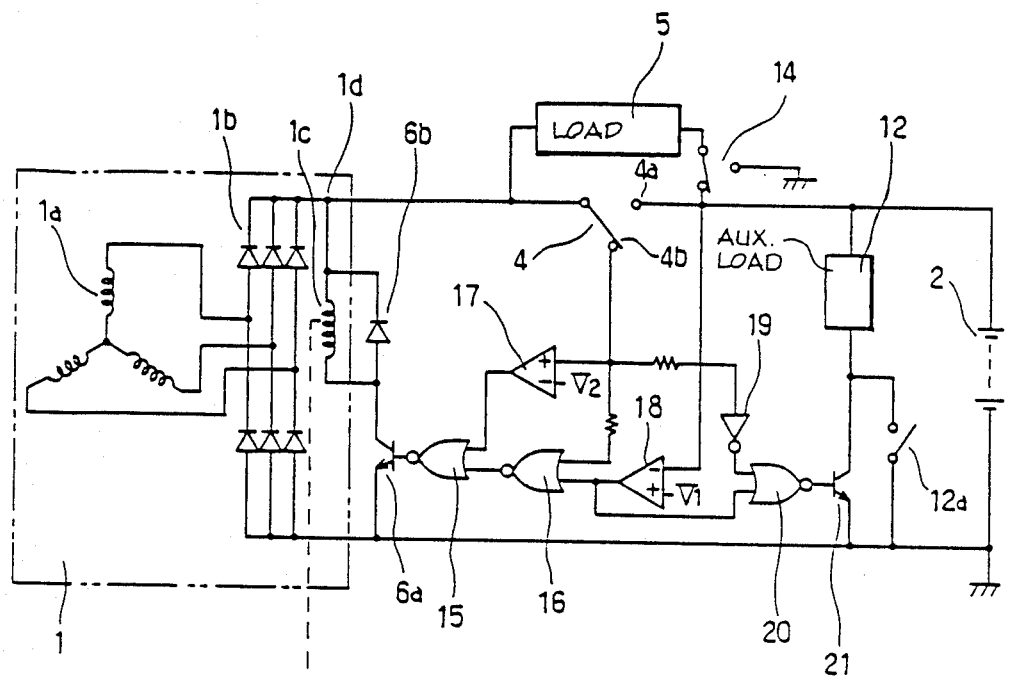
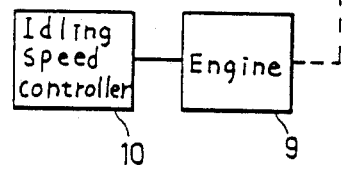
FIG.9
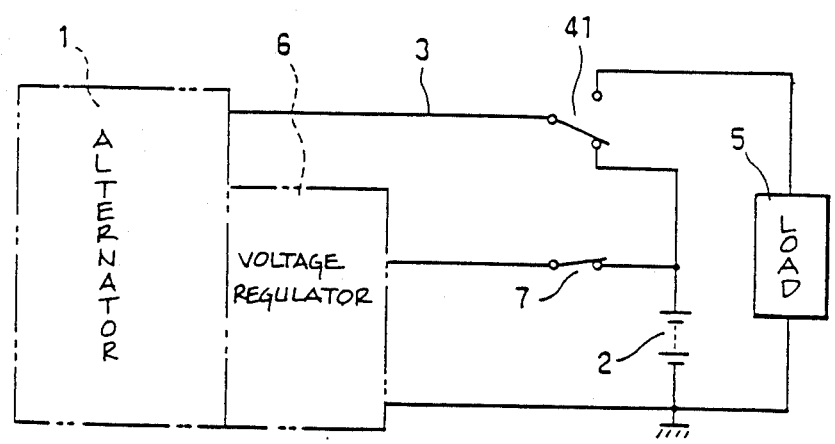

4,862,055

AUTOMOTIVE CHARGING APPARATUS

FIELD OF THE INVENTION

The present invention relates to an automotive charging apparatus, more precisely relates to an automotive charging apparatus having an alternator which can charge a battery while supplying high level voltage to a high voltage load such as a windshield deicer.

BACKGROUND OF THE INVENTION

A deicer provided on a windshield of an automobile requires a high electric power of 1500 W which needs a charge current at 70 V, for example. In order to operate the high voltage load, the conventional type apparatus employs a switch 41 within a line 3 which connects an alternator 1 to a battery 2 as shown in FIG. 9, so that the charge current from the alternator 1 is switched from the battery voltage level to the high voltage load 5 level. Since the voltage level of the battery 2 is reduced while the switch 41 is connected to the high voltage load 5, the alternator 1 is fully excited so that high voltage such as 70 V is supplied to the high voltage load 5.

The voltage of the battery 2 is returned as a feedback signal to the alternator 1 through a key switch 7 and a voltage regulating circuit 6 in order to control the output of the alternator 1 for maintaining the battery voltage within the predetermined value. Since the high voltage load such as a front de-icer is used during the starting period of the automobile when the battery is discharged for starting the engine, and since the conventional type apparatus could not charge the battery while the high voltage load is operated, the conventional type apparatus has such a disadvantage that the battery is too discharged to keep the battery voltage level.

SUMMARY OF THE INVENTION

The present invention has an object of solving the disadvantage of the conventional type apparatus. In other words, the object of the present invention s to charge the battery even while the high voltage load is operated. A further object of the present invention is to simplify the structure of the apparatus which supplies the voltage both to the battery and the high voltage load.

In order to attain the above objects, the apparatus of the present invention employs such structure that a high voltage load is connected in series with the line which connects the alternator to the battery and that a switch is connected in parallel with the high voltage load. The alternator of the present invention may be driven to rotate faster for improving the output level thereof as high as a second level when the switch is open. The alternator of the present invention is so controlled that the second level of the output is maintained within the range of the predetermined voltage level.

The apparatus of the present invention may employ the auxiliary electric load connected parallel with the battery when the switch is opened and the battery voltage is higher than the predetermined value. The output of the alternator of the present invention, therefore, may be switched to the second level when the switch is opened for supplying the high voltage to the high voltage load. Since the output of the alternator of the present invention can be maintained constantly, the current supplied to the high voltage load can be stabilized. The charge current supplying to the battery can be reduced when the auxiliary electric load is connected parallel with the battery.

Since the high voltage load of the present invention is controlled by means of the level of the charge current supplying the battery, the battery can be charged even while the high voltage load is operated by using such a simple structure that the switch is connected between the battery and the alternator. Since the second level of the output of the alternator of the present invention can be maintained within the range of the predetermined value, the current supplying the high voltage load can also be maintained so that the surplus current is prevented from being supplied to the high voltage load. Since the auxiliary electric load is connected in parallel to the battery when the battery voltage is higher than the predetermined value in order to release charge current of the battery, the surplus charging current is also prevented from being supplied to the battery which prevents overcharge.

BRIEF DESCRIPTION OF THE DRAWINGS

FIG. 2 is a graph showing the relationship between the output voltage of the alternator and the output electric power.

Figs.7 and 8 are schematic block diagrams showing the electric circuit of the fifth and sixth embodiments of the present invention respectively.

FIG. 9 is a schematic block diagram of the electric circuit according to the conventional type apparatus.

DETAIL DESCRIPTION OF THE PREFERRED EMBODIMENT

Figure 1:
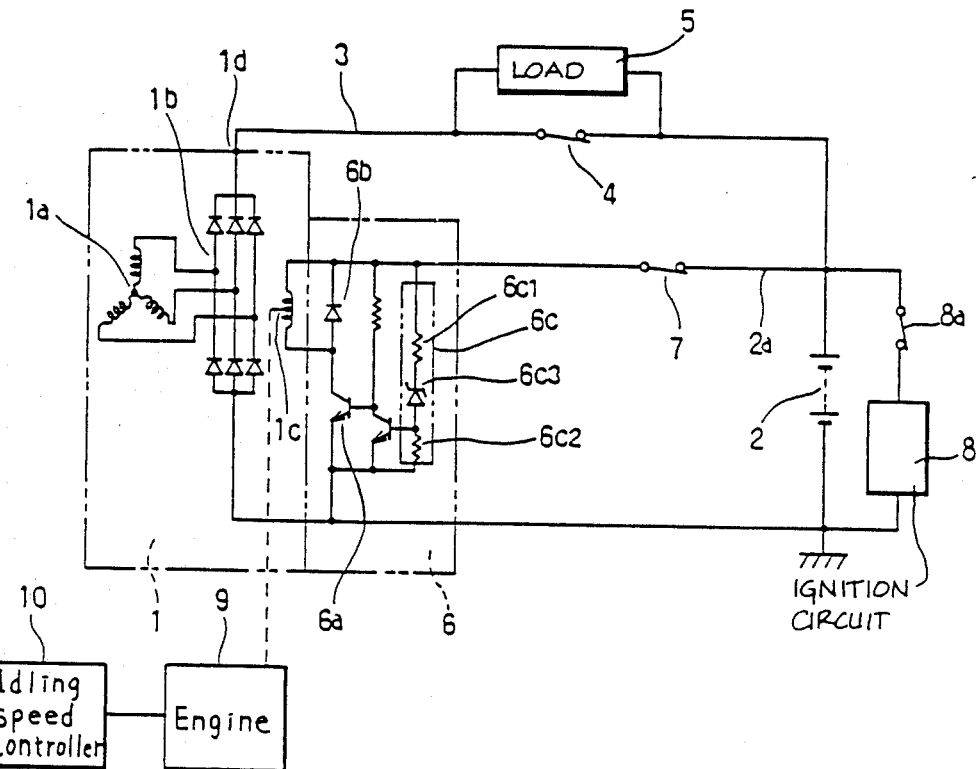
FIG. 1 is a schematic block diagram of an electric circuit according to the first embodiment of the present invention.

An alternator 1 provides a stator coil 1a by which an alternate current is generated, a full wave rectifier 1b which rectifies the alternate current generated by the stator coil 1a, and a rotor coil 1c which is provided on a rotor so that the rotor coil 1c is driven by the automotive engine 2 via a belt. The idling speed of the engine 2 is controlled by the idling speed controller 10.

One end of a charge line 3 is connected to an output terminal 1d of the alternator 1 and another end of the charge line 3 is connected to a battery 2. A switch member 4 is provided within the charge line 3 and a high voltage load 5 is connected to the charge line in such a manner that the high voltage load 5 is in parallel with the switch member 4.

A regulating circuit 6 has an output transistor 6a which is connected in series with the rotor coil 1c, a free wheel diode 6b which is connected in parallel with the rotor coil 1c, and a voltage detector 6c which is connected to the battery 2 through a key switch 7 and a battery-sensing line 2a. The voltage detector 6c provides dividing resistors 6c1 and 6c2 and zener diode 6c3 so that a first setting voltage (14.5 V for example) of the battery 2 is set. Numeral 8 represents an ignition circuit which is connected to the battery via a switch 8a so that the ignition timing of the automobile engine 9 is controlled by the circuit 8.

The charge current is supplied directly to the battery 2 when the switch 4 is closed. Since the battery voltage is returned as the feedback signal to the voltage regulating circuit 6 through the sensing line 2a, the voltage regulating circuit 6 controls the current generated by the rotor coil 1c in order to maintain the battery voltage within the range of the predetermined value in such a manner that the operation of the output transistor 6a is controlled.

The high voltage load of this embodiment is a windshield de-icer which is deposited on the windshield of the automobile. The resistance of the high voltage load is about 2.8 per an area of the windshield 90.8–1.0 m$^2$). The high voltage load 5 starts to operate when the switch member 4 is opened. The charge current is supplied to the battery 2 through the high voltage load 5. The electric power of 1500 W is required for the high voltage load 5 in order to de-ice the ice the thickness of which is about 1 mm deposited on the windshield within 2–3 minutes, so that a voltage of about 65 V ( the electric current of about 23.2A) is required to be supplied to the high voltage load 5.

In other words, the alternator 1 should generate a voltage of about 80 V in order to supply the battery voltage of 14.5 V to the battery 2 while supplying the voltage of about 65 V to the high voltage load 5. Since it is hard for the alternator 1 to generate the output voltage of about 80 V under the condition that the automotive engine rotates at a low speed, the idling speed of the automotive engine should be increased in order to generate an output voltage as high as 80 V.

As shown from FIG. 2, the rotation speed of the alternator 1 should be increased as high as 5000 rpm in order to generate the output voltage of 80 V and the output electric power of 1500 W. Accordingly, the idling speed controller 10 causes the automotive engine 9 to rotate at a high speed in order to increase the rotating speed of the to alternator 1 as high as 5000 rpm when the switch member 4 is opened.

The predetermined value of the electric current (23A) is required to be generated by the alternator 1. The current is divided to about 14A for the igniting circuit 8 and about 13A for the battery 2. Since the high voltage load 5 is operated when the automobile has not been operated for a long while and a starter has been used for starting the engine, the battery 2 should be in a discharging condition when the high voltage load 5 is operated so that surplus charging should not occur even if the charge current of 13 A is supplied to the battery 2 for about 2–3 minutes. Accordingly, the level of voltage of the battery 2 cannot reach the predetermined value during the operation of the high voltage load 5 so that the output transistor 6a turns on in order to fully excite the rotor coil 1c. Thereby the high output voltage of 80 V is generated for operating the high voltage load 5 and for charging the battery 2.

Figure 3:
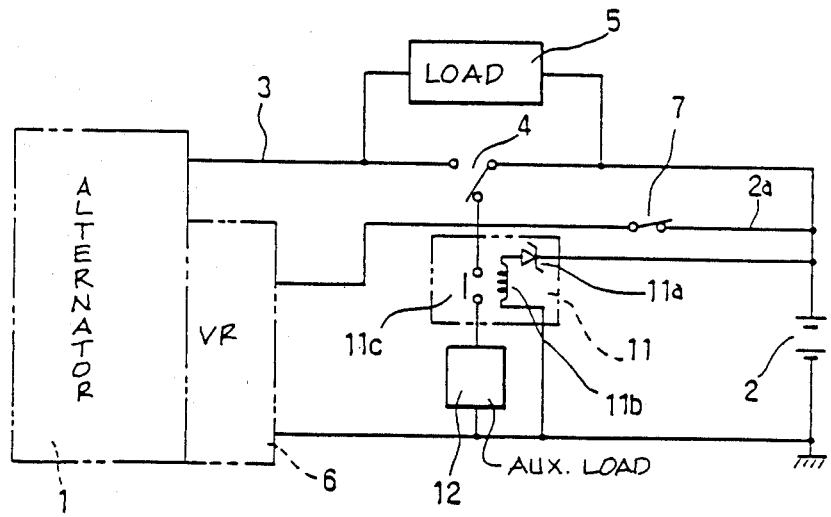
FIGS. 3 and 4 are schematic block diagrams of the electric circuit according to the second and the third embodiments of the present invention respectively.

The second embodiment of the present invention which can prevent the surplus charging of the battery is explained hereinafter by using FIG. 3. The structure of the alternator 1 and the voltage regulating circuit 6 is the same as those described in the first embodiment. A selecting switch member 4 is used for the second embodiment, one terminal of the switch member 4 is connected to the charge line 3 and another terminal of the switch member 4 is connected to an auxiliary switching relay 11. The relay 11 has a relay coil 11b which is connected to the battery through a diode 11a and a relay contact 11c which is connected to the terminal of the switch member 4. The relay contact 11c is connected to an auxiliary electric load 12 such as a defogger provided on a rear window of the automobile. The zener diode 11a comes to a transmitting condition when the battery voltage reaches as high as the predetermined value while the high voltage load is operated (the condition shown in FIG. 3) so that the relay coil 11a is excited for closing the relay contact 11c whereby the auxiliary electric load 12 is connected in parallel with the battery 2. Accordingly, the charge current is divided between the auxiliary electric load 12 and the battery 2 for preventing the surplus charging of the battery 2.

The ice deposited on the rear window of the automobile can also be deiced by the auxiliary electric load when the charge current is supplied to the auxiliary electric load 12. Since a current of about 23 A is required for the high voltage load 5 and since a current of about 10 A is required for the igniting circuit 8, the auxiliary electric is requires to have the capacity of as much as the difference (13A) of the current supplied to the high voltage load 5 and the igniting circuit 8. In other words, the auxiliary electric load 12 which can handle a current of more than 13A can prevent surplus charging of the battery 2.

Figure 4:
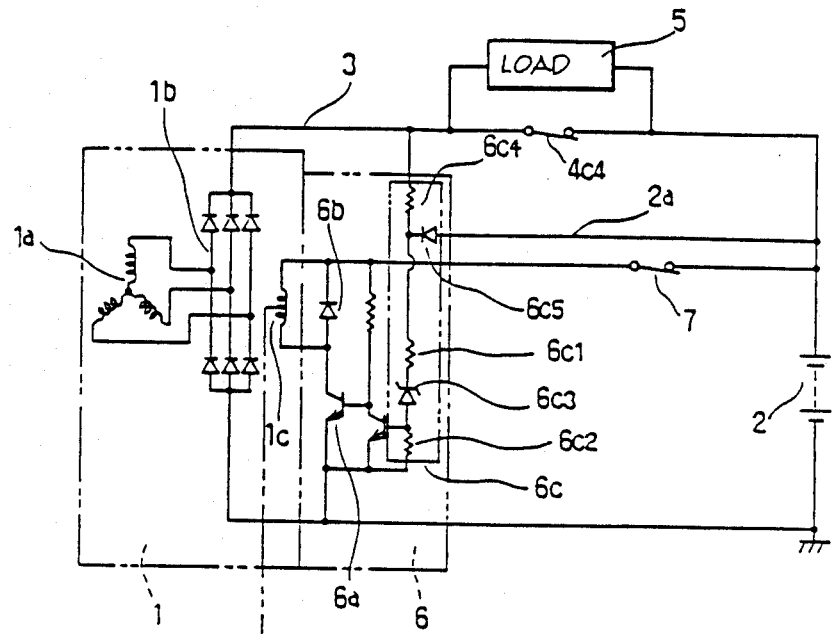

The third embodiment of the present invention which prevents surplus current being is supplied to the high voltage load 5 while the battery 2 is in a discharge condition is explained hereinafter by using FIG. 4. The cathode of the zener diode 6c3 is connected to the output terminal of the alternator through the registers 6c1 and 6c4, and the battery sensing line 2a is connected to the connecting point of the registers 6c1 and 6c4 through a diode 6c5. Since the output voltage of the alternator 1 increases in accordance with the charge current, the diode 6c3 turns to the transmitting condition for switching the transistor OFF so that the charging operation of alternator 1 ends when the output voltage becomes higher than the predetermined value. Accordingly, the discharge current supplied to the high voltage load 5 is well maintained within the range of the predetermined value.

Figure 5:
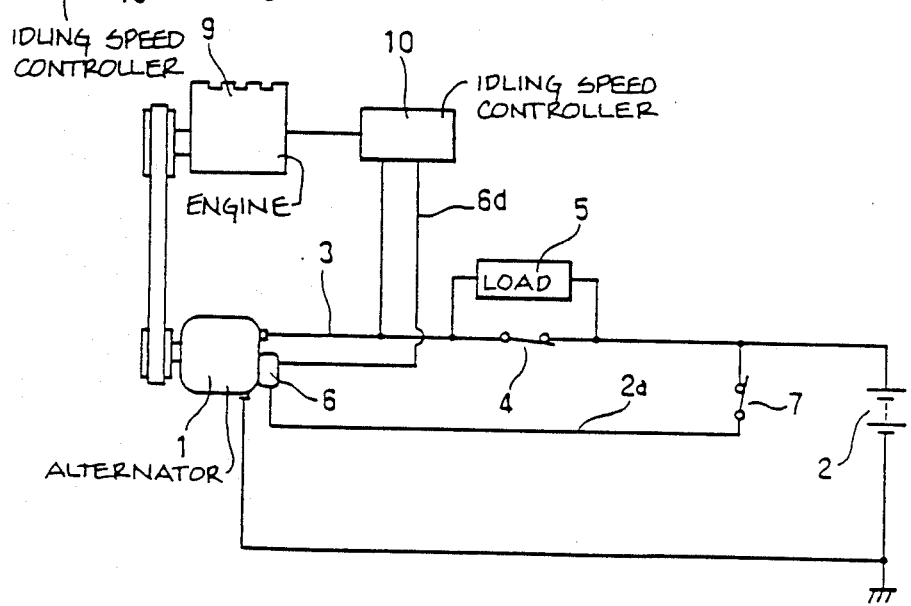
FIG. 5 is a schematic diagram of an electric circuit of the charging apparatus according to the fourth embodiment.
Figure 6:
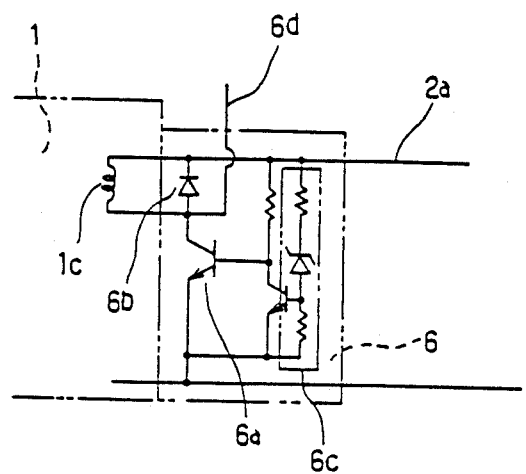
FIG. 6 is a schematic diagram of the electric circuit of the regulating circuit according to the fourth embodiment.

The fourth embodiment of the present invention which has the same object as that of the third embodiment is described hereinafter by using FIGS. 5 and 6. The idling speed controller 10 which controls the idling speed of the engine which drives the alternator 1 is electrically connected to the alternator 1 for receiving the output voltage thereof. The idling speed controller 10 is also connected to the transistor 6a of the voltage regulator 6 through the line 6d for receiving the collector voltage of the transistor 6a. As described in the first embodiment, the idling speed of the engine 9 is increased when the high voltage load 5 is operated. The idling speed controller 10 of the present embodiment makes the idling speed reduce when the output voltage of the alternator 1 becomes higher than the predetermined value for reducing the rotating speed of the alternator 1 so that the output voltage of the alternator 1 is maintained within the range of the predetermined value. Accordingly, the surplus charge current is prevented from being supplied to the high voltage load 5. The transistor 6a turns OFF when the battery voltage becomes higher than predetermined value. The idling speed controller 10 detects whether the transistor 6a turns ON or turns OFF through the line 6d for controlling the duty ratio of the transistor 6a. Accordingly, the idling speed controller 10 can make the idling speed reduce in order to prevent the condition that the surplus charging current is supplied to the battery 2.

Figure 7:
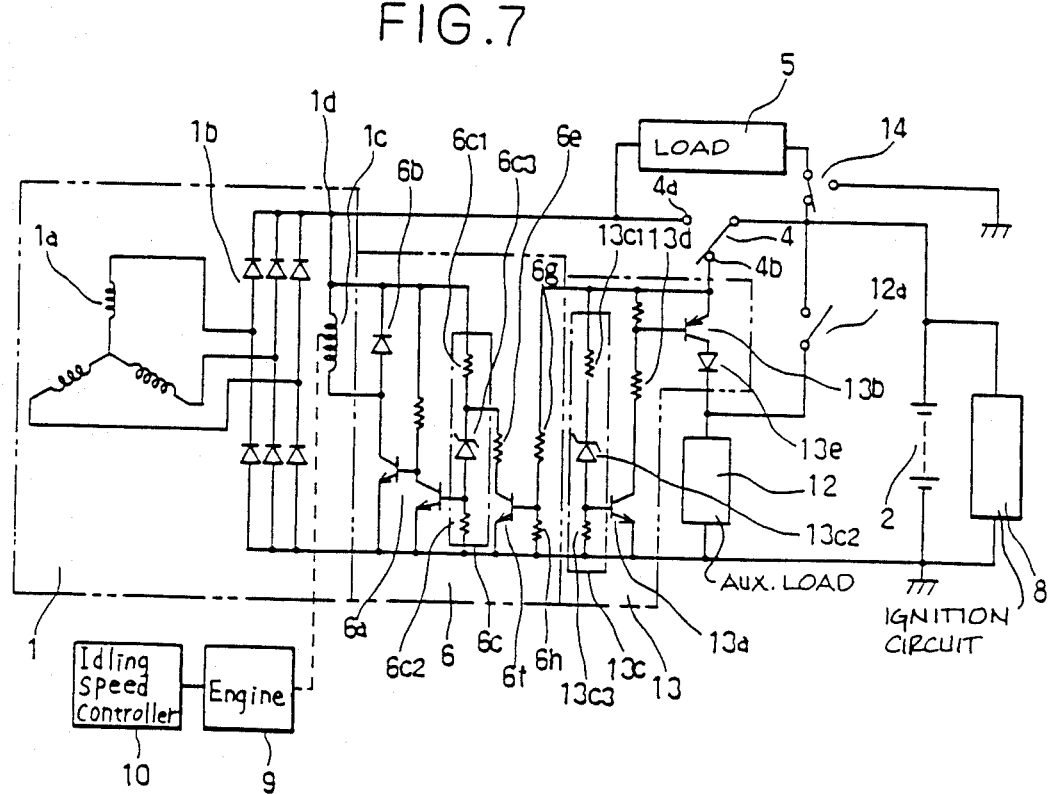

The fifth embodiment which is a combination of the second embodiment and third embodiment is explained hereinafter by using FIG. 7. A second voltage regulator 13 is employed other than the voltage regulator 6. A changing means for changing the value of the voltage detected by the voltage detector 6c is provided within the voltage regulator 6. The changing means has a resistor 6e which is connected in parallel with the zener diode 6c3 and the resistor 6c2 and the transistor 6f. A second voltage regulator 13 has a voltage detecting means 13c which is connected between the second fixed contact 4b of the switch member 4 and the ground, a first PNP transistor 13b and a diode 13e which are connected between the second fixed contact 4b of the switch member 4 and the auxiliary electric load 12, and a resistor 13b and a second NPN transistor 13a which are connected between the base of the first PNP transistor 13b and the ground. Numeral 14 designates a switch which changes the connection of the high voltage load 5 between the first position that the high voltage load is connected in series with the battery and the second position that the high voltage load 5 is connected in parallel with the battery 2. The transistor 6f does not transmit when the high voltage load 5 does not operate so that the rectified voltage of the voltage setting means 6c of the voltage regulator 6 is 14.5 V and the output transistor 6a is controlled in order to keep the battery voltage 14. 5 V.

The transistor 6f is turned to the transmitting condition by the voltage from the battery when the high voltage load 5 operates(switch member contacts to the second fixed contact 4b) so that the resistor 6e is connected for setting the rectified voltage of the voltage detector 6c of the voltage regulator 6 at 80 V. Since the output transistor 6a is controlled in such a manner that the voltage is supplied to the high voltage load, namely since the output voltage of the output terminal 1b of the alternator is maintained as 80 V, the surplus charge current is prevented from being supplied to the high voltage load 5.

The second transistor 13a of the second voltage regulator 13 is turned to the transmitting condition by the voltage detector 13 when the battery voltage increases higher than 14.5 V. The first transistor 13b also turned to the transmitting condition when the second transistor 13a is the transmitting condition so that the auxiliary electric load 12 is connected in parallel with the battery 2. Accordingly, a current is supplied to the auxiliary electric load 12 while preventing the surplus charging of battery 2.

The high voltage load 5 is connected in parallel with the battery 2 when the switch member 4 turns to the ground position so that the battery voltage is also supplied to the high voltage load 5. Even though the electric power of the high voltage load 5 decreases from the condition that the high voltage of 65 V is supplied to the load 5, the high voltage load 5 can still defog the front glass.

A sixth embodiment which is a modified embodiment of the fifth embodiment is explained hereinafter by using FIG. 8. A NOR circuit 15 which is connected to the base of the output transistor 6a is used for the sixth embodiment. A comparator 17 and a NOR circuit 16 is connected to the input side of the NOR circuit 15. The plus(+) side input of the comparator 17 is connected to the second fixed terminal 4b of the switch member 4 and the standard voltage of 80 V is supplied to the minus (−) side input of the comparator 17. One input terminal of the NOR circuit 16 is connected to the second fixed terminal 4b of the switch member 4 and another input terminal of the NOR circuit 16 is connected to the comparator 18. The minus (−) side input of the comparator 18 is connected to the battery 2 and a standard voltage V1 of 14.5 V is supplied to the plus (+) side input of the comparator 18. One inlet terminal of the NOR circuit 20 which drives a transistor 21 which is connected in series with the auxiliary electric load 12 is connected to the output of the comparator 18, and another inlet terminal of the NOR circuit 20 is connected to the second fixed terminal 4b of the switch member 4 through the an invertor 19. The output of the comparator 17 controls the output transistor 6a through the NOR circuit 15 when the high voltage load 5 operates, so that the voltage supplied to the high voltage load 5 is maintained at about 80 V. The output of the comparator 18 controls the transistor 21 through the NOR circuit 20 when the battery voltage is increased higher than 14.5 V, so that the charge current is supplied to the auxiliary electric load 12 in order to prevent the surplus charging of the battery 2. Since the comparator 18 detects whether the voltage is higher than 14.5 V or not, the single comparator 18 of the apparatus of the sixth embodiment can be used in the both conditions that the high voltage load operates and that the same does not operate.

What is claimed is:

1. An automotive charging apparatus comprising;
    alternator means for charging a battery,
    voltage regulator means for regulating an output voltage of said alternator means in such a manner that a battery voltage is maintained within a range of a first predetermined value,
    a high voltage load connected between said alternator means and said battery,
    a switch member provided in parallel with said high voltage load,
    means for changing the output voltage of said alternator to a second predetermined value which is higher than said first predetermined value when said switch member opens, and
    means for increasing a rotating speed of said alternator for increasing the output voltage of said alternator when said switch member is opened.

2. An automotive charging apparatus as in claim 1, wherein;
    said high voltage load is an electric resistance deposited on a windshield of an automobile for deicing said windshield.

3. An automotive charging apparatus claimed in claim 1, further comprising;
    idling speed controller means for controlling a rotating speed of an automotive engine, said idling speed controller means receiving the output voltage of said alternator as a feedback signal so that said idling speed controller means reduces the rotating speed of said automotive engine when said output voltage increases higher than a predetermined value which is higher than the battery voltage.

4. An automotive charging apparatus comprising;

an automotive alternator having a stator coil and a rotor coil,
switch means connected in series with said rotor coil,
a load connected between said automotive alternator and a battery,
a switch member connected in parallel with said load,
voltage regulator means including said switch means for controlling a current through said rotor coil to maintain an output voltage of said alternator within a range of a first predetermined voltage when said switch member is closed and for controlling a current through said rotor coil to change the output voltage of said alternator to a second voltage which is higher than said first voltage when said switch member is opened,
an auxiliary electric load which is connected in parallel with said battery, and
auxiliary switch means for connecting said auxiliary electric load in parallel with said battery when said switch member is opened and when the battery voltage becomes higher than the first predetermined voltage.

5. An automotive charging apparatus claimed in claim 4, wherein;
said auxiliary electric load can transmit a current the value of which is larger than a difference between a current transmitting to said high voltage load and current transmitting to a common load connected to said battery.

* * * * *